United States Patent

Ashauer et al.

[11] 4,257,284
[45] Mar. 24, 1981

[54] NOISELESS SHIFTING APPARATUS FOR A TRANSMISSION REVERSE GEAR

[75] Inventors: Karl Ashauer; Fritz Blumenstein, both of Wolfsburg, Fed. Rep. of Germany

[73] Assignee: Volkswagenwerk Aktiengesellschaft, Fed. Rep. of Germany

[21] Appl. No.: 961,773

[22] Filed: Nov. 17, 1978

[30] Foreign Application Priority Data

Nov. 19, 1977 [DE] Fed. Rep. of Germany ....... 2751699

[51] Int. Cl.³ .......................... F16H 3/38; F16H 3/08
[52] U.S. Cl. ......................................... 74/339; 74/329
[58] Field of Search .......................... 74/329, 333, 339

[56] References Cited

U.S. PATENT DOCUMENTS

| | | | |
|---|---|---|---|
| 1,913,162 | 6/1933 | Keller | 74/339 |
| 2,256,320 | 9/1941 | Lapsley | 74/339 |
| 2,535,632 | 12/1950 | Herr, Jr. | 74/333 X |
| 2,571,474 | 10/1951 | Ochs et al. | 74/339 |
| 2,660,900 | 12/1953 | Swenson | 74/333 X |
| 3,280,650 | 10/1966 | Clement | 74/339 |
| 3,362,244 | 1/1968 | Ivanchich | 74/339 |
| 3,511,116 | 5/1970 | Detra | 74/339 X |
| 3,921,469 | 11/1975 | Richards | 74/339 |

FOREIGN PATENT DOCUMENTS

| | | |
|---|---|---|
| 2018399 | 6/1974 | Fed. Rep. of Germany . |
| 2708999 | 2/1978 | Fed. Rep. of Germany . |
| 1122892 | 9/1956 | France . |
| 1189603 | 10/1959 | France . |
| 1313752 | 11/1962 | France . |
| 307631 | 3/1929 | United Kingdom . |

*Primary Examiner*—Leslie Braun
*Attorney, Agent, or Firm*—Brumbaugh, Graves, Donohue & Raymond

[57] ABSTRACT

Apparatus for synchronously shifting the reverse gear of a speed-changing transmission, such as an automobile transmission, includes an axially displaceable reverse shift gear which is rotatably mounted on a stationary shaft and cooperates (meshes) with a first gear on a first transmission shaft and a second, wider gear on a second transmission shaft. The reverse shift gear has a synchronizing device, provided with synchronizing cones and locking components, which becomes operative to brake the reverse shift gear with respect to a stationary element when the shift gear is axially displaced.

8 Claims, 4 Drawing Figures

NOISELESS SHIFTING APPARATUS FOR A TRANSMISSION REVERSE GEAR

The present invention concerns apparatus for synchronously shifting the reverse gear of a speed-changing transmission, such as an automobile transmission. More particularly, the invention relates to an axially displaceable reverse shift gear which is rotatably mounted on a stationary shaft and cooperates (meshes) with a first gear on a first transmission shaft and a second, wider gear on a second transmission shaft. The reverse shift gear has a synchronizing device, provided with synchronizing cones and locking components, which becomes operative to brake the reverse shift gear with respect to a stationary element when the shift gear is axially displaced.

A synchronizing device of this type is known and is disclosed, for example, in the German published patent application (DAS) No. 2,018,399. In this arrangement, the reverse shift or sliding gear carries or forms a synchronizing cone which constantly bears against a counter cone that is provided with locking elements and is biased by a stationary spring. The counter cone is axially displaceable in opposition to the spring and is finitely rotatable as far as a locking position. In this arrangement, the spring continuously acts on the counter cone and also keeps the sliding gear, when in the disengaged position, constantly separated from the two mating gears. In view of the spring, which constantly acts on the counter cone and thereby also on the reverse shift gear in a direction counter to the engagement direction of this reverse gear, it is necessary to increase the shifting force in order to prevent the reverse shift gear from jumping out of engagement. This need for increasing the shifting force of course impairs the ease of shifting. Moreover, during the engagement process and even when the reverse shift gear is engaged, a friction contact is maintained between the synchronizing cone forming a part of the reverse shift gear and the stationary cone, thereby braking the reverse shift gear and continuously wearing the cone surfaces during operation of the vehicle in reverse gear. Wearing of this kind is extremely critical since it occurs directly on the reverse shift gear which eventually must be replaced at considerable cost.

The steady friction contact between the synchronizing cone and the counter cone has an additional disadvantage during the engagement process also. Upon engagement of the reverse shift gear, which has been braked and is therefore stationary, with a first mating transmission gear, which is possibly still rotating, meshing engagement of the gear teeth becomes more difficult. Breaking of the reverse shift gear is logical and necessary only after the shift gear has meshed with the first mating gear, but not before.

SUMMARY OF THE INVENTION

It is an object of the present invention to provide a transmission which may be shifted noiselessly into a reverse gear, but which avoids the aforementioned disadvantages of the prior art.

This object, as well as other objects which will become apparent from the discussion that follows, are achieved, according to the present invention, by means of a synchronizing device that includes (1) a sleeve having an inner cone which is arranged concentrically with the reverse shift gear shaft and is fixed in the axial and circumferential directions; (2) a braking ring rotatably mounted within the sleeve and having an outer cone cooperating with the inner cone of the sleeve; and (3) locking elements, arranged on the reverse shift gear when it is shifted into the engaged position.

In accordance with a particular embodiment of the invention, the reverse shift gear is provided with a hub-like extension having guide grooves distributed around its circumference. These guide grooves are stepped in width in the circumferential direction and have inclined locking surfaces for engagement with locking teeth that project radially inwardly from the internal circumference of the braking ring. These locking teeth have slanted facing surfaces on the sides thereof directed toward the reverse shift gear which cooperate with the slanted locking surfaces of the grooves. In particular, these locking teeth preferably exhibit roof-shaped profiles, thus forming the slanted locking surface. Preferably also, the braking ring is retained with respect to the sleeve in such a manner as to maintain play in the axial direction.

As will be understood from the foregoing, the gear shifting apparatus in accordance with the invention avoids the use of a stationary spring which constantly applies an engaging force to the synchronizing cones. It also removes the synchronizing cones from the reverse shift gear to a braking ring arranged between the shift gear and a stationary sleeve whereby the braking ring is retained relative to the sleeve with a certain degree of axial play. The synchronizing cone provided on the outer periphery of the braking ring thus comes into contact with the counter cone arranged on the inner periphery of the sleeve only if, during the engagement process, the slanted roof-shaped surfaces on the radially inwardly projecting locking teeth of the braking ring are engaged against the locking surfaces that extend between the two different-width guide grooves on the hub-like extension of the reverse shift gear. Before and after the synchronizing process is effected, however, the outer cone of the braking ring can detach itself from the inner cone of the sleeve due to the axial play of the braking ring with respect to the sleeve, so that during these operating states no friction contact, and thus no braking or wear, can occur. If, after an extended period of operation of the vehicle, the wear of the synchronizing cones should become too great, the reverse shift gear need not be replaced; it is sufficient, rather, if only the sleeve and the braking ring are replaced.

The shifting arrangement in accordance with the invention is further distinguished by a relatively small overall height so that it may be possible to utilize the otherwise unused space at the level of the mating pair of speed change gears. In many cases, subsequent installation (retrofit) in already existing structures is possible without major modification.

For a better understanding of the invention, together with other and further objects, reference is made to the following description, taken in conjunction with the accompanying drawings, and its scope will be pointed out in the appended claims.

BRIEF DESCRIPTION OF THE DRAWINGS

FIGS. 2–4 each illustrate a different shifting position of the reverse shift gear.

DESCRIPTION OF THE PREFERRED EMBODIMENT

Figure 1:
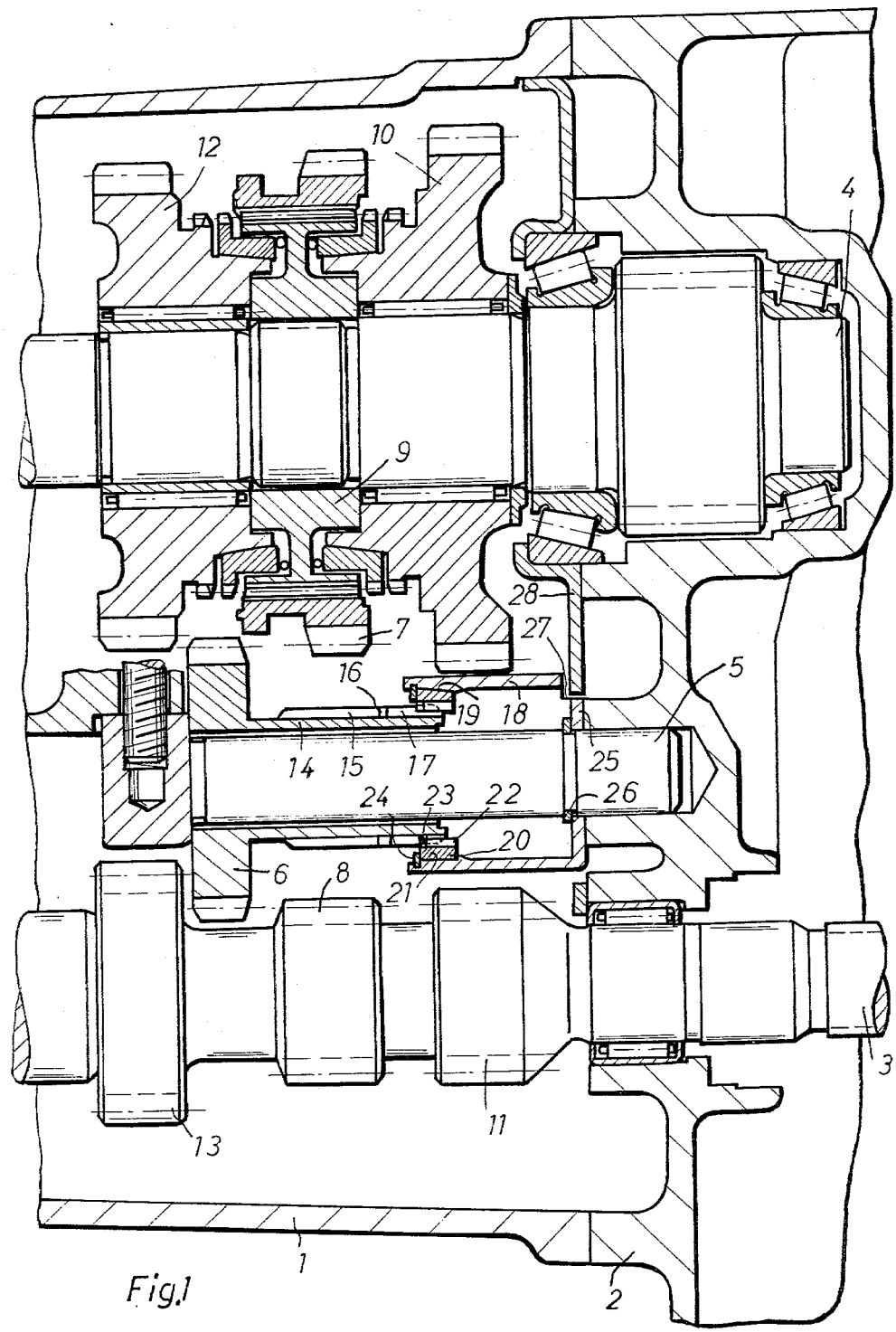
FIG. 1 is a longitudinal sectional view through a portion of an automobile transmission. For better illustration, the two shafts accommodating axially fixed reverse gears are drawn as being arranged in a common plane with a third shaft on which is mounted an axially displaceable reverse shift gear.

FIG. 1 illustrates a portion of an automobile transmission housing 1 connected to a drive axle gear casing 2. Arranged within the housing 1 and casing 2 is a driving shaft 3 which is coupled to the crankshaft of the automobile engine through a clutch (not shown). A driven shaft 4, also arranged within the housing 1 and casing 2, supplies the mechanical output to the drive axle. In the figure, the two rotable power shafts 3 and 4 have been represented as lying in a common plane with a third shaft 5. However, in practice the third shaft 5 is displaced to one side with respect to a plane passing through the longitudinal axes of shafts 3 and 4. The third shaft 5 is held stationary within the housing 1 and casing 2 and supports a rotatable reverse shift gear 6. This shift gear is displaceable axially on the shaft 5 to cause engagement with the gears 7 and 8 supported on the shafts 4 and 3, respectively. When the teeth of the reverse shift gear 6 engage the respective teeth of the gears 7 and 8, the shaft 3 is in driving (reverse) engagement with the shaft 4, with a suitable transmission gear ratio corresponding to the respective numbers of teeth on the gears 7 and 8.

The gear 7 arranged on the driven shaft 4 is constructed in this exemplary embodiment as a circle of teeth arranged on the outer periphery of a synchronizing device 9. This synchronizer 9 serves in the transmission to synchronize the shifting of the first and second speeds: the first speed being associated with the gears 10 and 11 and the second speed associated with the gears 12 and 13. It is evident that these pairs of gears are actually constantly in meshing engagement with each other and are separated here only because of the special manner of illustration (i.e., the illustration of the three shafts 3, 4 and 5 in a common plane).

The reverse shift gear 6, which rotates and is axially displaceable on the stationary shaft 5, is provided with a hub-like extension 14 having guide grooves 15 and 17 distributed around its periphery. As is more apparent from FIGS. 2–4, the guide grooves have different widths in the circumferential direction. In particular, the guide groove portions 17 facing away from the reverse shift gear 6 are wider in the circumferential direction than the guide groove portions 15. The groove portions 15 and 17 are connected by locking surfaces 16 which extend at an inclination relative to the longitudinal axis of the shaft 5.

The guide grooves 15 and 17 receive locking teeth 22 which project inwardly from the inner periphery of the braking ring 20. A synchronizer cone 21 is fashioned on the outer periphery of the braking ring 20 and interacts with an inner cone 19 on a sleeve 18 which is arranged concentrically with the shaft 5 and, like the shaft, is fixed in position in the axial and circumferential directions. The sleeve 18 is fixed axially in this exemplary embodiment by a retaining ring 26 held on the fixed shaft 5. The bottom 25 which closes one end of the sleeve 18 is clamped between the retaining ring 26 and the wall of the casing 2. An offset or step in the diameter of the shaft 5 could also be provided in place of the retaining ring 26. The sleeve 18 is fixed in the circumferential direction by a means of a partition 28 clamped securely between the two housing parts 1 and 2. This partition 28 engages in a recess 27 in the periphery of the sleeve. The recess may be sufficiently wide and deep so as to simultaneously serve as a discharge opening for the transmission lubricant that penetrates the interior of the sleeve.

Figure 2:
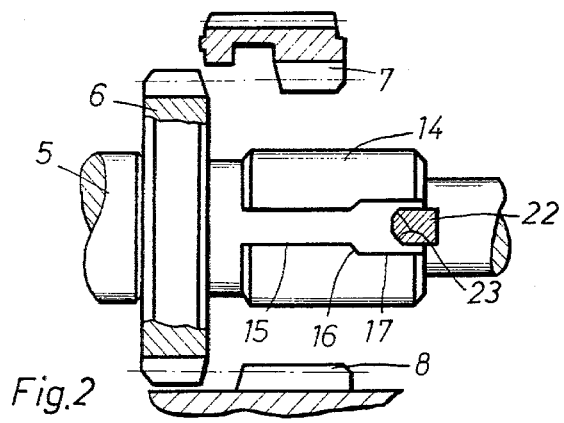
FIGS. 2–4 are cross-sectional views showing a detail of the transmission illustrated in FIG. 1.
Figure 3:
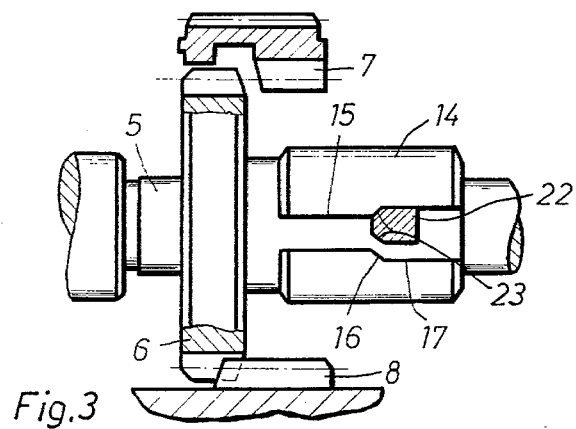
Figure 4:
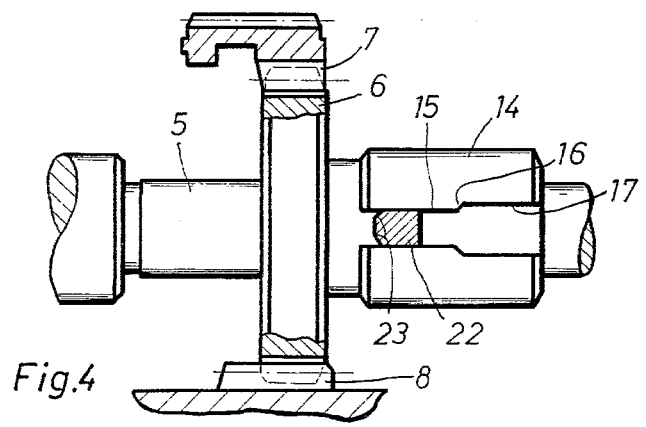

The braking ring 20 is secured with respect to the sleeve 18 by means of a retaining ring 24. This ring 24 is positioned so as to leave some axial play. The teeth 22 of the braking ring 20 are provided with slanted facing surfaces 23 on the sides thereof directed toward the reverse shift gear 6. In particular, the profiles of these teeth are "roof shaped", as indicated in FIGS. 2–4. During the synchronizing process, the slanted surfaces 23 interact with the locking surfaces 16 between the guide groove portions 15 and 17 of the hub-like extension 14 on the gear 6.

The operation of the gear shift arrangement according to the present invention will now be described with reference to FIGS. 2–4, each of which shows a different position of the shifting elements. FIG. 2 shows the position of the shifting elements participating in the engagement of the reverse gear when the reverse gear is disengaged. In the exemplary embodiment illustrated, the teeth of the shift gear 6 do not mesh with the teeth of either the gear 7 on the driven shaft 4 or the gear 8 (which is wider than the gear 7) on the driving shaft 3. As shown in FIG. 2, the teeth 22 of the braking ring 20 are located in a center position between the groove walls of the wider groove portions 17 of the hub-like gear extension 14.

When the shifting process for engaging the reverse gear commences, the shift gear 6 is displaced, by means of a shifting finger (not shown), from the position shown in FIG. 2 toward the position shown in FIG. 3 in which the teeth of the shift gear 6 are initially engaged with the teeth of the wider gear 8 on the driving shaft 3. At this point, the driving shaft may still have a certain speed, due to the inertia of the components directly connected to this shaft, especially when the shift to the reverse gear directly follows one of the forward speeds. Before reaching the braking position shown in FIG. 3, the reverse shift gear 6 will rotate freely as its teeth mesh with those of the gear 8, because the outer cone 21 of the braking ring 20 has not been pressed against the inner cone of the sleeve 18 so as to produce a friction contact. Thus, the shift gear 6 is rapidly accelerated until there is no longer any relative movement between the engaged teeth of the gear 6 and the teeth of the gear 8. The braking ring 20, maintained in the sleeve 18 with a certain degree of axial play, is entrained in this position through contact of the groove sides of the wider guide groove portions 17 with the locking teeth 22.

The narrower reverse gear 7 on the driven shaft 4 is connected by means of the axle with the driving wheels of the vehicle. Since the vehicle is stationary when the reverse gear is engaged, the gear 7 will also be stationary and the driving section, consisting of the driving shaft 3, the associated gear 8 and the shift gear 6, must be braked in order to prevent engagement noises. This braking is effected in the position shown in FIG. 3 wherein the roof-shaped slanted facing surfaces 23 of the locking teeth 22 on the braking ring 20 come to bear against the inclined locking surfaces 16 arranged between the different width guide groove portions 17 and 15 of the hub-like shift gear extension 14. As a result, an axial force is exerted on the braking ring 20 which presses the outer cone 21 on this ring against the inner cone 19 of the sleeve 18, thereby producing a friction contact. Further displacement of the shift gear 6, with a small back rotation of the braking ring 20, now becomes possible only when the shift gear 6, as well as the reverse gear 8 with which it is engaged, have come to rest.

The final engaged position of the shift gear is shown in FIG. 4. In this position, the shift gear 6 has come to a complete stop and is meshed without difficulty with the reverse gear 7 that is connected with the driven shaft 4.

When the shift gear 6 is engaging the reverse gear 7, the locking teeth 22 on the braking ring 20 are guided within the guide groove portions 15 of the hub-like extension 4. Although these guide groove portions 15 are narrower than the portions 17, the teeth 22 are free to move axially, permitting the outer cone 21 of the braking ring 20 to become detached from the inner cone 19 of the sleeve 18. Thereafter, if the vehicle clutch is engaged and the driven shaft 3 is connected with the crankshaft of the vehicle engine so as to operate the vehicle in reverse gear, there is no longer any friction contact between the braking ring 20, which rotates with the reverse shift gear 6, and the stationary sleeve 18. Consequently, there is no braking force nor any wear of the cone-shaped contact surfaces.

Due to the fact that friction contact between the inner cone 19 of the sleeve 18 and the outer cone 21 of the braking ring 20 is present only during the synchronizing process, it is also possible to construct the teeth of the gear 8 on the driving shaft 3 with sufficient width so that the gear 8 will be continuously engaged with the shift gear 6, thus even in the starting position shown in FIG. 2. In this manner, the uncontrolled process of engaging the teeth of the shift gear 6 with the teeth of the gear 8 can be eliminated. This is of advantage, particularly in the case of high speed drives.

It will be appreciated that with the shifting apparatus according invention, it is possible to disengage the reverse gear without any difficulty or impediment. This ease of disengagement is apparent from a consideration of FIGS. 2–4.

While there has been described what is believed to be the preferred embodiment of the invention, those skilled in the art will recognize that various changes and modifications may be made thereto without departing from the spirit and scope of the invention, and it is intended to claim all such embodiments as fall within the true scope of the invention.

We claim:

1. A speed changing transmission, in particular a motor vehicle transmission, comprising:

(a) a first gear arranged on a first transmission shaft;
   (b) a second gear arranged on a second transmission shaft, said second gear being wider than said first gear;
   (c) a third gear rotatably mounted on a third shaft, said third gear being axially displaceable and arranged to engage said first and second gears, said third gear having synchronizing means including:
      (1) a sleeve, arranged concentrically with said third shaft and fixed in its axial and circumferential directions, said sleeve having an inner cone;
      (2) a braking ring rotatably mounted within said sleeve and having an outer cone cooperating with the inner cone of said sleeve; and
      (3) locking means, arranged on said third gear and said braking ring, for braking said third gear when it is shifted into the engaged position;

whereby said third gear is a reverse gear of said transmission which may be noiselessly engaged with said first and second gears.

2. The transmission defined in claim 1, wherein said third gear includes a hub-shaped extension having guide grooves distributed around its circumference, said grooves being defined, in part, by slanted locking surfaces; and wherein said braking ring includes a plurality of locking teeth projecting radially inwardly from the internal circumference thereof and engaging said grooves.

3. The transmission defined in claim 2, wherein said locking teeth have slanted facing surfaces on the sides thereof directed toward said third gear, said slanted facing surfaces cooperating with said slanted locking surfaces of said grooves.

4. The transmission defined in claim 3, wherein the profiles of said locking teeth are roof-shaped.

5. The transmission defined in claim 4 further comprising means for retaining said braking ring with respect to said sleeve while maintaining play in the axial direction.

6. The transmission defined in claim 5, further comprising means for retaining said sleeve in the axial direction between said third shaft and the adjacent transmission housing.

7. The transmission defined in claim 6, wherein said sleeve has a recess in its outer, circumferential surface, and further comprising a stationary member inserted in said recess for retaining said sleeve in the circumferential direction.

8. The transmission defined in claim 7, wherein said recess is adapted as an outflow opening for lubricant located within said sleeve.

* * * * *